(12) United States Patent
Matsuo

(10) Patent No.: US 9,100,450 B2
(45) Date of Patent: Aug. 4, 2015

(54) ELECTRONIC UNIT, A COMMUNICATION UNIT AND A COMMUNICATION SYSTEM AND METHOD

(75) Inventor: Tomoki Matsuo, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 1365 days.

(21) Appl. No.: 12/265,055

(22) Filed: Nov. 5, 2008

(65) Prior Publication Data

US 2009/0125162 A1 May 14, 2009

(30) Foreign Application Priority Data

Nov. 14, 2007 (JP) .................................. 2007-295151

(51) Int. Cl.
*G06F 7/00* (2006.01)
*H04L 29/08* (2006.01)
*H04L 29/06* (2006.01)

(52) U.S. Cl.
CPC ............ *H04L 67/2823* (2013.01); *H04L 67/12* (2013.01); *H04L 67/28* (2013.01); *H04L 69/08* (2013.01)

(58) Field of Classification Search
None
See application file for complete search history.

(56) References Cited

U.S. PATENT DOCUMENTS

| | | | | |
|---|---|---|---|---|
| 6,147,938 A * | 11/2000 | Ogawa et al. | ................... | 369/12 |
| 6,711,138 B1 * | 3/2004 | Pai et al. | ...................... | 370/257 |
| 8,086,365 B2 * | 12/2011 | Frei et al. | ..................... | 701/29.6 |
| 2005/0004735 A1 * | 1/2005 | Kelly et al. | .................... | 701/50 |
| 2005/0025161 A1 * | 2/2005 | Spooner | ........................ | 370/401 |
| 2006/0089756 A1 * | 4/2006 | Iwagami et al. | ................... | 701/1 |
| 2006/0142914 A1 * | 6/2006 | Yokogawa | ....................... | 701/35 |
| 2006/0271694 A1 * | 11/2006 | Matsuo et al. | ................ | 709/229 |
| 2006/0287784 A1 * | 12/2006 | Kanki | ............... | 701/29 |
| 2007/0228826 A1 * | 10/2007 | Jordan et al. | ................. | 307/10.1 |
| 2007/0274328 A1 * | 11/2007 | Sonoda et al. | ................ | 370/401 |
| 2008/0037504 A1 * | 2/2008 | Jeon et al. | ..................... | 370/342 |
| 2008/0155405 A1 * | 6/2008 | Lock et al. | .................... | 715/700 |
| 2008/0163312 A1 * | 7/2008 | Faust et al. | ..................... | 725/93 |
| 2010/0031106 A1 * | 2/2010 | Isoyama | ....................... | 714/746 |
| 2010/0121507 A1 * | 5/2010 | Ishii et al. | ....................... | 701/22 |
| 2012/0265405 A1 * | 10/2012 | Matsumura et al. | ........... | 701/45 |

FOREIGN PATENT DOCUMENTS

| | | |
|---|---|---|
| DE | 102007019308 | 10/2007 |
| EP | 1327563 | 7/2003 |
| EP | 1482698 | 12/2004 |
| JP | 2000-078179 | 3/2000 |
| JP | 2002-271944 | 9/2002 |
| JP | 2003-175781 | 6/2003 |

\* cited by examiner

*Primary Examiner* — Jonathan L Sample
(74) *Attorney, Agent, or Firm* — Gerald E. Hespos; Michael J. Porco; Matthew T. Hespos

(57) ABSTRACT

An electronic control unit has a gateway function for connecting a plurality of communication networks formed in a vehicle with each other and performs functions allotted beforehand by transmitting and receiving signals via the communication networks. The electronic control unit includes a plug-in connecting portion (39) to be plug-in connected with a relay unit (4) for converting protocols applied to the respective communication networks, thereby connecting the relay unit (4) with a communication bus (10), in the case of performing the gateway function, and a communication circuit portion (36) for transmitting and receiving signals between the communication bus (10) and the relay unit (4) when the relay unit (4) is plug-in connected with the plug-in connecting portion (39).

7 Claims, 6 Drawing Sheets

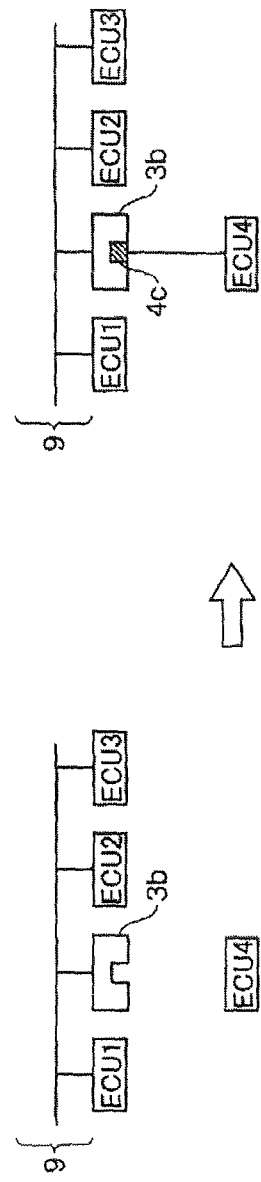

ELECTRONIC UNIT, A COMMUNICATION UNIT AND A COMMUNICATION SYSTEM AND METHOD

BACKGROUND OF THE INVENTION

1. Field of the Invention

The invention relates to an electronic control unit and a communication unit capable of connecting a plurality of communication networks formed in a vehicle with each other, and a communication system connected with the electronic control unit and the communication unit and to a method.

2. Description of the Related Art

Known communication systems have a plurality of electronic control units (ECUs) for controlling parts of a vehicle. The ECUs are connected via a communication bus to enable mutual data communication. Cooperation control among the ECUs of such a communication system has become easier in recent years with the multiplexing and speeding-up of vehicle communication. Specifically, it became possible to connect many ECUs with one communication bus to increase the number of combinations of ECUs for data transfer.

The known communication system described above is separated into a plurality of communication buses and these communication buses are connected via a relay device, such as a gateway to form a multiplexed communication system (see, for example, Japanese Unexamined Patent Publication No. 2000-78179, Japanese Unexamined Patent Publication No. 2003-17581 and Japanese Unexamined Patent Publication No. 2002-271994).

Japanese Unexamined Patent Publication No. 2000-78179 and Japanese Unexamined Patent Publication No. 2003-17581 disclose an electrical connection box capable of connecting a plurality of communication networks. According to these documents a gateway circuit connects a plurality of communication networks with the electrical connection box. Thus, communication is conducted by one relaying by the electrical connection box without via another wiring harness even if the protocols of units connected with a wiring harness connected with the electrical connection box differ and communication is conducted among these units.

Japanese Unexamined Patent Publication No. 2003-17581 also discloses a construction enabling CAM communication between the communication bus and the electrical connection box by providing the electrical connection box with a CAN communication function as an automotive communication protocol.

However, the following problem was present in the case of utilizing the electrical connection boxes disclosed in the above documents as a relay device of a multiplexed communication system for vehicle. Specifically, in the multiplexed communication system for vehicle, a relay device, which was unnecessary at an initial stage of development, may possibly become necessary at a later stage of development or conversely a relay, which was necessary at an initial stage of development, may possibly become unnecessary at a later stage due to an increase or decrease in the number of ECUs, a revision in communication specifications during the development of the communication system.

If a new relay device becomes necessary at the later stage of development, there is no place for installing the new relay device in many cases. Even if an installation place could be ensured, the communication bus and the wiring harness including the communication bus need to be laid again, with the result that the installation of the new relay device is often difficult.

On the other hand, if the relay device becomes unnecessary at the later stage of development, wires and an installation place for the relay device may be wasted. Particularly, in the case of incorporating the relay device into an ECU having another function for cost reduction or other reason instead of realizing the relay device as an independent device, the relay device is wasted without being used, which increases cost.

In view of the above problems, an object of the present invention is to provide an electronic control unit, a communication unit and a communication system and method capable of preventing an increase in development cost resulting from the addition or deletion of a relay device even in the case of an increase or decrease in the number of ECUs, a revision in communication specifications or the like during the development of the communication system.

SUMMARY OF THE INVENTION

The invention relates to an electronic control unit having a gateway function for connecting a plurality of communication networks formed in a vehicle with each other and performing functions allotted beforehand by transmitting and receiving signals via the communication networks. The electronic control unit has at least one plug-in connecting portion connected with a communication line for carrying signals transmitted from and/or received by the electronic control unit and to be plug-in connected with a relay unit for converting protocols applied to the respective communication networks, thereby connecting the relay unit with the communication line, when the electronic control unit performs the gateway function. The electronic control unit also has at least one communication circuit portion for transmitting and/or receiving signals between the communication line and the relay unit when the relay unit is plug-in connected with the plug-in connecting portion.

The relay unit for converting different protocols is connected via the plug-in connecting portion to convert the protocols of signals inputted to and/or outputted from the communication line using the relay unit in the case of performing the gateway function. Thus, even if it becomes necessary to add or delete the relay unit due to an increase in the number of the ECUs, a revision in communication specifications or the like during the development of a communication system, the relay unit can be added to or deleted from the communication system without requiring a design change of the communication system or the like through the plug-in connection of the relay unit or the cancellation of such connection.

It is preferable to further comprise a power supply circuit portion connected with a power supply line for supplying a power supply voltage to the electronic control unit and adapted to supply a part of the power supply voltage supplied from the power supply line to the relay unit via the plug-in connecting portion when the relay unit is plug-in connected with the plug-in connecting portion. Thus, it is not necessary to provide a new power supply line for supplying the power supply voltage to the relay unit, thereby reducing development cost.

The invention also relates to a communication unit for connecting a plurality of communication networks formed in a vehicle. The communication unit comprises an electronic control unit having a gateway function for connecting the plurality of communication networks with each other and performing functions allotted beforehand by transmitting and receiving signals via the communication networks. At least one relay unit is provided for converting protocols applied to the respective communication networks for the mutual connection of the communication networks. The electronic control unit includes at least one plug-in connecting portion connected with a communication line for carrying signals transmitted from and/or received by the electronic control unit and to be plug-in connected with the relay unit, thereby connecting the relay unit with the communication line, when the electronic control unit performs the gateway function. The electronic control unit also has at least one communication circuit portion for transmitting and/or receiving signals between the communication line and the relay unit when the relay unit is plug-in connected with the plug-in connecting portion.

In the above communication unit, the relay unit for converting different protocols is connected with the electronic control unit via the plug-in connecting portion to convert the protocols of signals inputted to and/or outputted from the communication line using the relay unit in the case of performing the gateway function. Thus, even if it becomes necessary to add or delete the relay unit due to an increase in the number of the ECUs, a revision in communication specifications or the like during the development of a communication system, the relay unit can be added to or deleted from the communication system without requiring a design change of the communication system through the plug-in connection of the relay unit or the cancellation of such connection.

The relay unit preferably includes first and second input/output portions to be plug-in connected with the plug-in connecting portion, and a relay circuit portion connected between the first and second input/output portions for converting the protocol of a signal inputted from one of the first and second input/output portions and outputting the signal having the protocol converted to the other input/output portion. Further, the second input/output portion preferably is connected either to the communication network different from the one, to which the electronic control unit belongs, or to an electronic control unit different from the electronic control unit or to both. Thus, even if it becomes necessary to add a new communication network as the communication specifications are revised, the new communication network can be added and connected without laying a new communication bus by connecting the relay unit with the electronic control unit. Further, even if the ECUs belonging to the communication network run out due to a change in control contents, a new ECU can be added to the communication network by connecting the relay unit with the electronic control unit.

The electronic control unit preferably further comprises a power supply circuit portion connected with a power supply line for supplying a power supply voltage to the electronic control unit and adapted to supply a part of the power supply voltage supplied from the power supply line to the relay unit via the plug-in connecting portion when the relay unit is plug-in connected with the plug-in connecting portion. In this case, the power supply voltage necessary for the operation of the relay unit can be supplied from a power supply control unit. Thus, it is not necessary to provide a new power supply line for supplying the power supply voltage to the relay unit, thereby reducing development cost.

The invention also relates to a communication system with a plurality of communication networks formed in a vehicle. The communication system also includes an electronic control unit having a gateway function for connecting the communication networks with each other and performing functions allotted beforehand by transmitting and receiving signals via the communication networks. At least one relay unit is provided for converting protocols applied to the respective communication networks for the mutual connection of the communication networks. The electronic control unit has at least one plug-in connecting portion connected with a communication line for carrying signals transmitted from and/or received by the electronic control unit and to be plug-in connected with the relay unit, thereby connecting the relay unit with the communication line, when the electronic control unit performs the gateway function. The electronic control unit also has at least one communication circuit portion for transmitting and/or receiving signals between the communication line and the relay unit when the relay unit is plug-in connected with the plug-in connecting portion.

In the above communication system, the relay unit for converting different protocols is connected with the electronic control unit via the plug-in connecting portion to convert the protocols of signals inputted to and outputted from the communication line using the relay unit in the case of performing the gateway function. Thus, even if it becomes necessary to add or delete the relay unit due to an increase in the number of the ECUs, a revision in communication specifications or the like during the development of the communication system, the relay unit can be added to or deleted from the communication system without requiring a design change of the communication system or the like through the plug-in connection of the relay unit or the cancellation of such connection.

The invention also relates to a communication method comprising providing a plurality of communication networks formed in a vehicle. The method also includes connecting the communication networks with each other by means of an electronic control unit having a gateway function and performing functions allotted beforehand by transmitting and/or receiving signals via the communication network. The method also includes converting protocols applied to the respective communication networks for the mutual connection of the communication networks by means of at least one relay unit, connecting at least one plug-in connecting portion with a communication line for carrying signals transmitted from and/or received by the electronic control unit and plug-in connecting the plug-in connecting portion with the relay unit. The method is operative for connecting the relay unit with the communication line when the electronic control unit performs the gateway function, and transmitting and/or receiving signals between the communication line and the relay unit by means of at least one communication circuit portion when the relay unit is plug-in connected with the plug-in connecting portion.

According to the method, there can be provided an electronic control unit, a communication unit and a communication system capable of preventing an increase in development cost resulting from the addition or deletion of a relay device even in the case of an increase in the number of ECUs, a revision in communication specifications or the like during the development of the communication system.

These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

FIG. 5 are diagrams showing a case where three communication networks are connected, wherein

FIG. 6 are diagrams showing a case where a new ECU is added and connected to one communication system, wherein FIG. 6(a) shows a state before connection and FIG. 6(b) shows a state after connection.

DETAILED DESCRIPTION OF THE PREFERRED EMBODIMENTS

Figure 1:
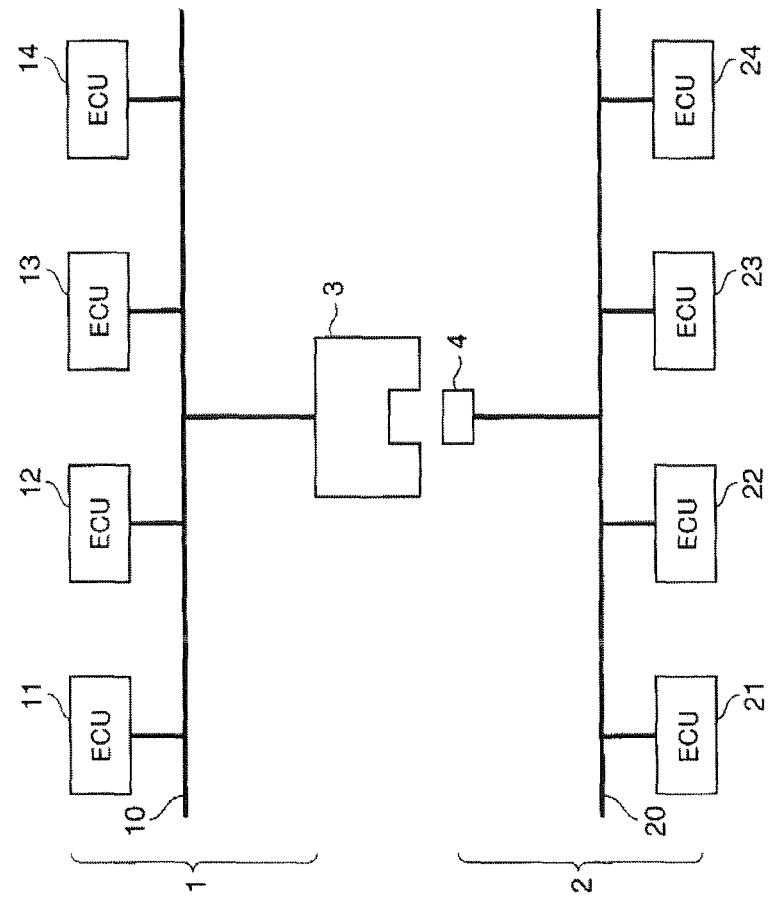
FIG. 1 is a block diagram showing a schematic construction of a communication system according to one embodiment of the invention.

FIG. 1 is a block diagram showing a schematic construction of a communication system according to the embodiment of the present invention. In the communication system according to this embodiment, a communication network 1 is a standard communication network system, which is less likely to be changed during a development or at the time of a model change, and connects a relay electronic control unit (ECU) 3 and electronic control units ECUs 11 to 14 to each other via a communication bus 10 as shown in FIG. 1.

The ECUs 11 to 14 are, for example, a brake ECU for controlling the orientation and/or braking of a vehicle, a steering ECU for controlling an assist force at the time of steering, a transmission ECU for changing a transmission gear ratio according to speed and engine speed, and/or a suspension ECU for controlling damping forces of shock absorbers, bushes and the like and the spring constants and the like of springs.

The relay ECU 3 is, for example, a body control ECU provided with a door lock function for controlling the unlocking and locking of one or more doors and/or an illumination control function for controlling the dimming of an interior lamp.

The relay ECU 3 has a plug-in structure so that a relay unit (relay device) 4 provided with a gateway function for communication protocol conversion can be mounted according to needs.

The relay ECU 3 and the ECUs 11 to 14 supply power and transmit and receive signals via a wiring harness (not shown) as a preferred bundle of wires assembled with connectors such as terminals and housings, joints, junk blocks, protection devices such as fuses, and one or more covering parts such as tapes and corrugated tubes, wherein the communication bus 10 is also assembled into the wiring harness.

A communication network 2 is a communication network system suitable for an increase or decrease in the number of ECUs and a revision in communication specifications and connects a relay unit 4 and ECUs 21 to 24 to each other via a communication bus 20. The ECUs 21 to 24 are, for example, a security ECU for theft prevention, an air conditioning control ECU for rear seats, and/or an entertainment function ECU and the like, which are suitably ECUs to be added or deleted according to needs.

Next, the relay ECU 3 and the relay unit 4 as characteristic parts of the present invention are described. First of all, the relay ECU 3 is described with reference to FIG. 2.

Figure 2:
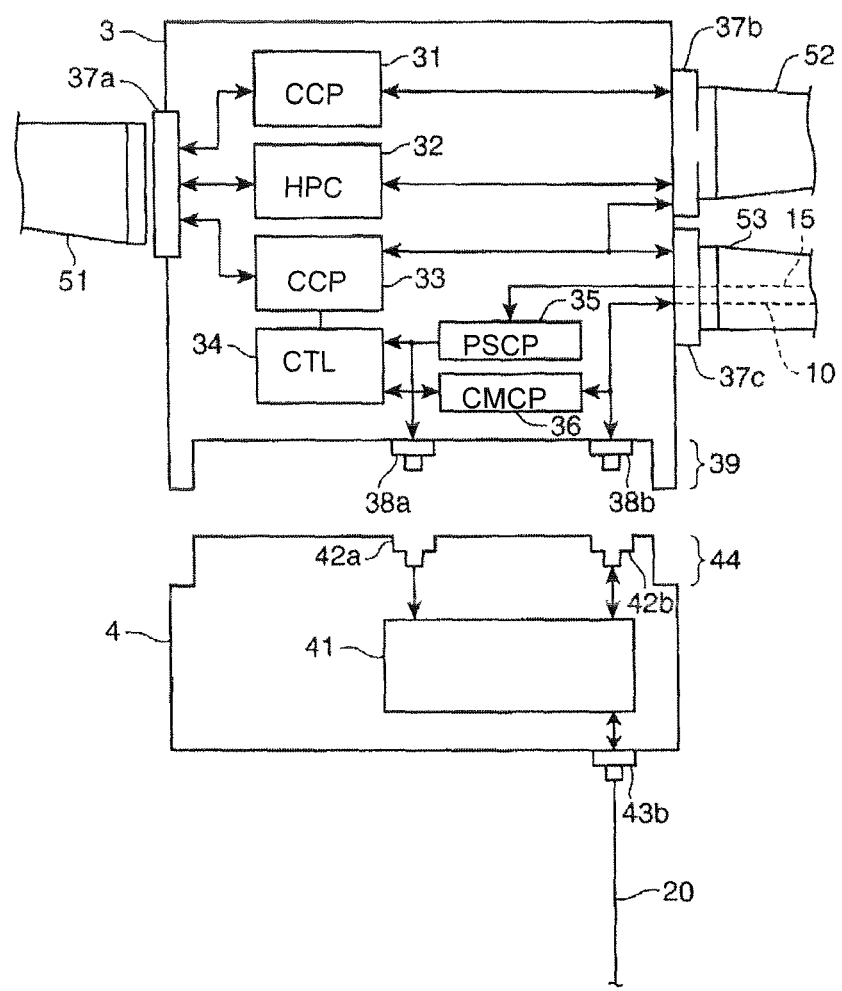
FIG. 2 is a block diagram showing schematic constructions of a relay ECU and a relay unit according to the embodiment of the invention.

FIG. 2 is a block diagram showing schematic constructions of the relay ECU 3 and the relay unit 4 according to this embodiment. As shown in FIG. 2, the relay ECU 3 according to this embodiment includes one or more circuit connecting portions 31, 33, at least one harness protecting portion 32, at least one controller 34, at least one power supply circuit portion 35, at least one communication circuit portion 36, one or more connectors 37a, 37b and 37c, and/or at least one power supply terminal 38a and/or a communication terminal 38b.

In the relay ECU 3 according to this embodiment, a wiring harness 51 is connected with the connector 37a, a wiring harness 52 is connected with the connector 37b and a wiring harness 53 is connected with the connector 37c. The circuit connecting portion 31 is connected between the connectors 37a and 37b for branch connection between wirings included in the wiring harness 51 and those included in the wiring harness 52. The harness protecting portion 32 including at least one fuse or protecting circuit for protecting the wiring harnesses 51, 52 is also connected between the connectors 37a and 37b. Similarly, the circuit connecting portion 33 is connected between the connectors 37a and 37c to connect and disconnect wirings included in the wiring harness 51 and those included in the wiring harness 53.

The controller 34 includes, for example, a microcomputer, receives the supply of operating power from the power supply circuit portion 35, is connected with the communication circuit portion 36 for communication with other ECU(s) and controls the circuit connecting portion 33. The controller 34 preferably also simultaneously controls various circuits (not shown) installed in or connected with the relay ECU 3 to realize controls allotted to the relay ECU 3. For example, if the relay ECU 3 is a body control ECU connected with the communication network 1, various circuits necessary to realize the door lock function for controlling the unlocking and locking of doors, the illumination control function for controlling the dimming of the interior lamp and the like are installed in or connected with the relay ECU 3.

The power supply circuit portion 35 is connected between the connector 37c and the power supply terminal 38a, converts a power supply voltage supplied from a power supply line 15 included in the wiring harness 53 into a voltage suitable for the operation of an electronic circuit element such as the microcomputer and supplies the resulting voltage to the power supply terminal 38a. The power supply voltage supplied from the power supply circuit portion 35 preferably is also supplied to the respective parts of the relay ECU 3 such as the controller 34 to be used for the operations of the respective parts.

The communication circuit portion 36 is connected between the connector 37c and the communication terminal 38b for transmitting and receiving signals between the communication bus 10 included in the wiring harness 53 and the communication terminal 38b, and causes signals inputted to the relay ECU 3 via the communication bus 10 to be outputted from the communication terminal 38b while causing signals inputted from the communication terminal 38b to be outputted to the communication bus 10.

As shown in FIG. 2, the power supply terminal 38a and the communication terminal 38b are or comprise one or more male terminals and arranged on (preferably the bottom surface of) a recessed portion 39 of the relay ECU 3. The recessed portion 39 is capable of plug-in connection with a projected portion 44 of the relay unit 4, and a power supply terminal (female terminal) 42a and a communication terminal (female terminal) 42b of the relay unit 4 arranged on the upper surface of the projected portion 44 are respectively connected with the power supply terminal 38a and the communication terminal 38b of the relay ECU 3 by the plug-in connection of the recessed portion 39 and the projected portion 44. In this way, the relay ECU 3 can be plug-in connected with the relay unit 4 by being provided with the recessed portion 39 capable of plug-in connection with the projected portion 44 of the relay unit 4. The respective terminals of the relay ECU 3 and the relay unit 4 are sufficient to be connectable with each other and it does not matter which ones are male terminals and which ones are female terminals.

Next, the relay unit 4 is described with reference to FIG. 2.

As shown in FIG. 2, the relay unit 4 according to this embodiment includes at least one relay circuit portion 41, the power supply terminal 42a and the communication terminal 42b, which are or comprise one or more female terminals, and a communication terminal 43b, which is or comprises at least one male terminal.

In the relay unit 4 according to this embodiment, the relay circuit portion 41 is or is to be connected with the power supply terminal 42a and the communication terminals 42b, 43b. The relay circuit portion 41 is or comprises a circuit for realizing a gateway function of the relay unit 4, converts the protocol of a signal inputted from the communication terminal 42b and outputs the resulting signal from the communication terminal 43b, and/or preferably converts the protocol of a signal inputted from the communication terminal 43b and outputs the resulting signal from the communication terminal 42b. In this way, various signals can be transmitted and received between the ECUs 11 to 14 and the relay ECU 3 of the communication network 1 and the relay unit 4 and the ECUs 21 to 24 of the communication network 2, and the respective ECUs can realize the allotted functions in cooperation with the functions of the ECUs connected with the different communication network.

A power supply voltage necessary for the operation of the relay circuit portion 41 is, for example, supplied via the power supply terminal 42a. The power supply terminal 42a is or is to be connected with the power supply terminal 38a of the relay ECU 3 by the plug-in connection of the projected portion 44 and the recessed portion 39 of the relay ECU 3, and the power supply voltage supplied from the power supply circuit portion 35 of the relay ECU 3 preferably is supplied to the relay circuit portion 41 via the power supply terminals 38a and 42a.

Figure 3:
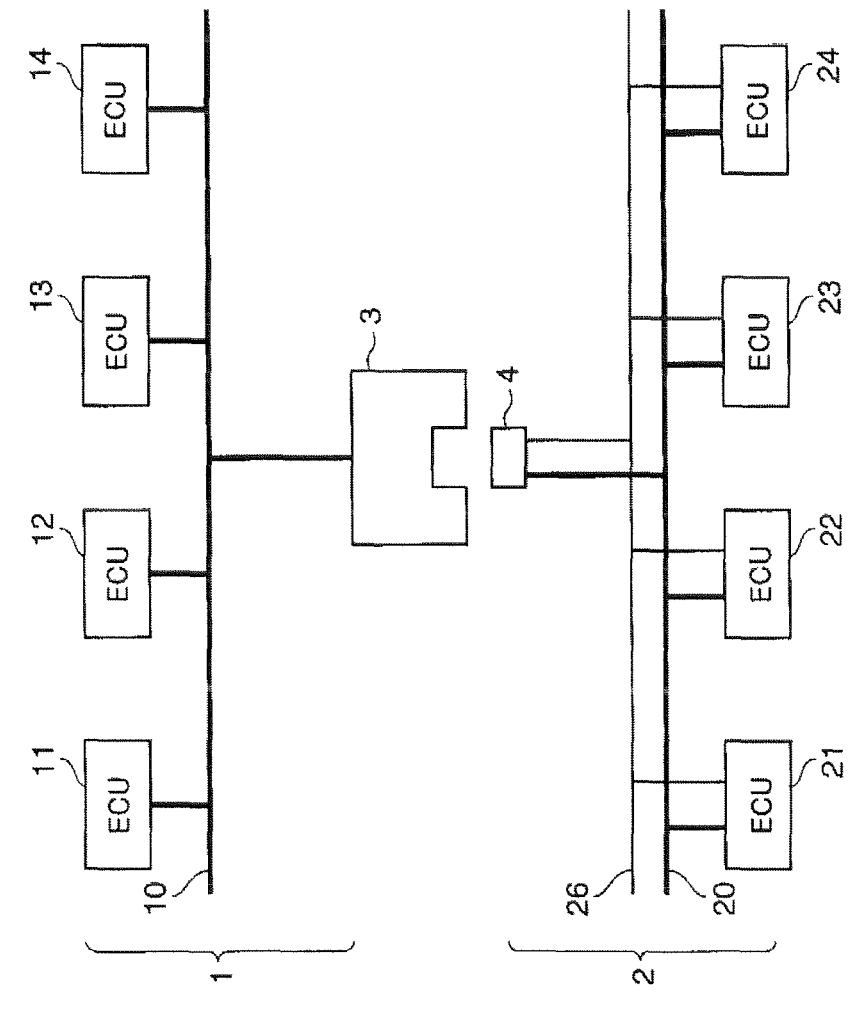
FIG. 3 is a block diagram showing another schematic construction of a communication system according to the embodiment of the invention.
Figure 4:
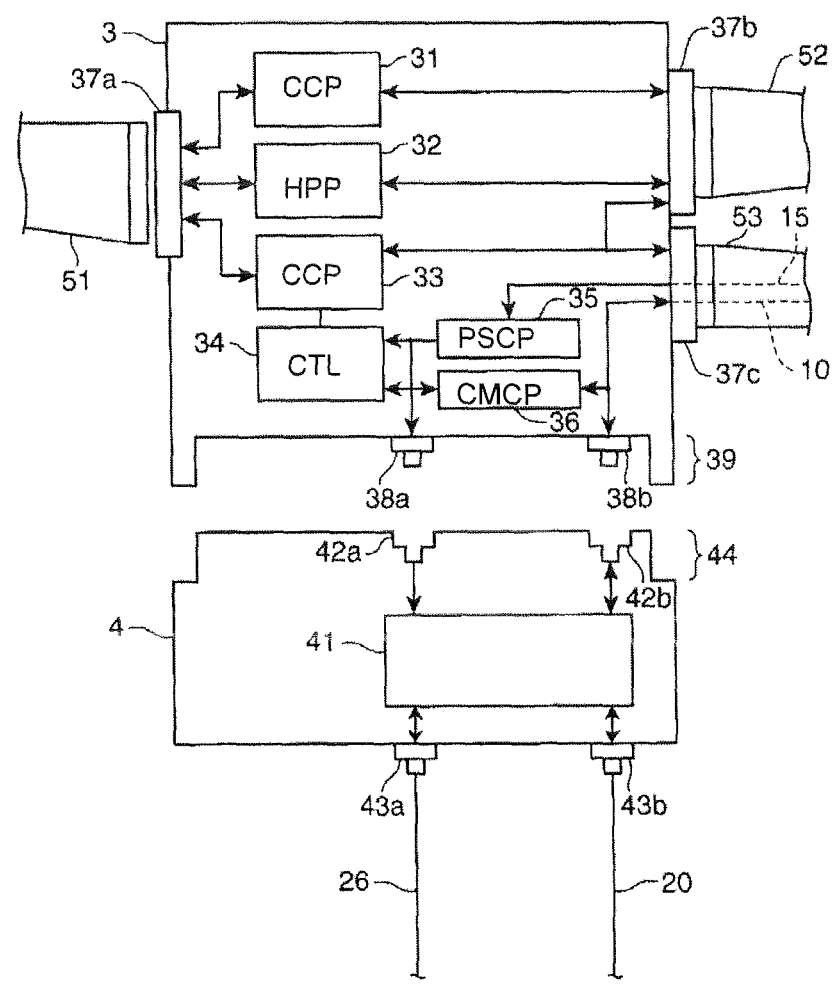
FIG. 4 is a block diagram showing other schematic constructions of a relay ECU and a relay unit according to the embodiment of the invention.

As shown in FIGS. 3 and 4, the relay circuit portion 41 may be operated by a power supply voltage supplied from the power supply terminal 42a and may supply a part of the supplied power supply voltage to the outside from the relay unit 4 via the power supply terminal 43a. In the relay unit 4 of FIGS. 3 and 4, a power supply line 26 of the communication network 2 is connected with the power supply terminal 43a. Thus, the relay ECU 3 and the relay unit 4 preferably can supply the power supply voltage supplied from the power supply line 15 of the communication network 1 to the power supply line 26 of the communication network 2.

Figure 5A:
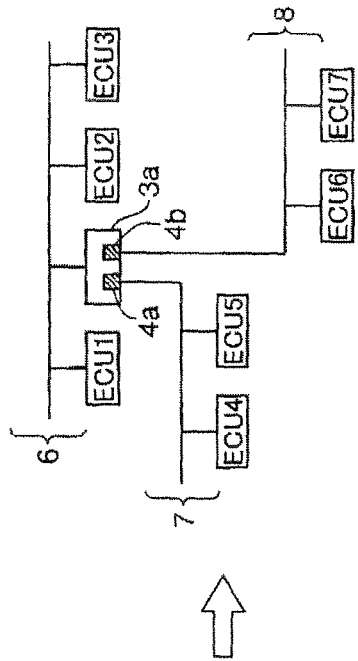
FIG. 5(a) shows a state before connection and FIG. 5(b) shows a state after connection.
Figure 5B:
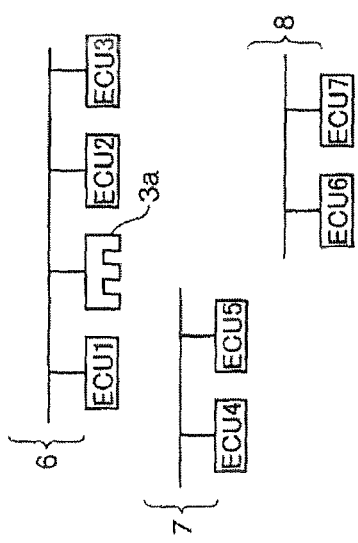

Although the relay ECU and the relay unit for relaying between the two communication networks 1, 2 are described in this embodiment, the embodiment is not limited to this. FIGS. 5(*a*) and 5(*b*) are diagrams showing a case where three communication networks are connected. As shown in FIGS. 5(*a*) and 5(*b*), a relay ECU 3a and a relay unit 4a are plug-in connected and the relay ECU 3a and a relay unit 4b are plug-in connected between three communication networks 6, 7 and 8. By doing so, various signals can be transmitted and received between ECUs 1 to 3 of the communication network 6, ECUs 4, 5 of the communication network 7 and ECUs 6, 7 of the communication network 8, and the respective ECUS can realize allotted functions in cooperation with functions of the ECUs connected with the different communication networks.

The relay ECU and the relay unit of this embodiment are also applicable in the case of adding and/or connecting at least one new ECU for executing the same or similar control as the preinstalled ECU to one communication network. FIGS. 6(*a*) and 6(*b*) are diagrams showing a case where a new ECU is added and connected to one communication network. As shown in FIGS. 6(*a*) and 6(*b*), a relay ECU 3b and a relay unit 4c are plug-in connected in a communication network 9. By doing so, even if it becomes necessary to extend a communication bus through the addition or the like of a new ECU at a later stage of the development of a communication system, the new ECU can be added utilizing existing power supply and signal communication. Therefore, cost increase resulting from the extension of the communication bus can be suppressed without requiring a drastic change, for example, in wiring.

The embodiment of the present invention disclosed this time is merely an example and the present invention is not limited to this. The scope of the present invention is indicated not by the disclosed contents, but by the appended claims, and is intended to embrace meaning equivalent to the appended claims and all changes within the scope of the claims.

What is claimed is:

1. An electronic control unit having a gateway function for connecting a first communication network formed in a vehicle with at least one other communication network and performing functions allotted beforehand by transmitting and/or receiving signals via the communication networks, comprising:

at least one plug-in connecting portion including a first connector connected with a communication line of the first communication network for carrying signals transmitted from and/or received by the electronic control unit and a first communication terminal to be plug-in connected with a detachable relay unit, the detachable relay unit including a second communication terminal for mating with the first communication terminal and a second connector connected with a communication line of the at least one other communication network, the detachable relay unit including a relay circuit portion for converting the protocol of a signal inputted from the second communication terminal, outputting the resulting signal from the second connector, converting a signal inputted from the second connector and outputting the resulting signal from the second communication terminal, thereby connecting the detachable relay unit with the communication line of the first communication network, when the electronic control unit performs the gateway function, and at least one communication circuit portion disposed in the at least one plug-in connecting portion for transmitting and/or receiving signals between the communication line of the first communication network and the communication line of the at least one other communication network connected to the detachable relay unit when the detachable relay unit is plug-in connected with the at least one plug-in connecting portion.

2. The electronic control unit of claim 1, further comprising a power supply circuit portion connected with a power supply line for supplying a power supply voltage to the electronic control unit and adapted to supply a part of the power supply voltage supplied from the power supply line to the relay unit via the plug-in connecting portion when the relay unit is plug-in connected with the plug-in connecting portion.

3. A communication unit for connecting a plurality of communication networks formed in a vehicle, comprising:

an electronic control unit having a gateway function for connecting a first communication network with at least one other communication network and performing functions allotted beforehand by transmitting and/or receiving signals via the communication networks and at least one plug-in connecting portion, the at least one plug-in connecting portion including a first connector connected with a communication line of the first communication network for carrying signals transmitted from and/or received by the electronic control unit and a first communication terminal to be plug-in connected with a detachable relay unit, thereby connecting the detachable relay unit with the communication line of the first communication network, when the electronic control unit performs the gateway function, the detachable relay unit including a second communication terminal for mating with the first communication terminal and a second connector connected to a communication line of the at least one other communication network, the detachable relay unit including a relay circuit portion for converting the protocol of a signal inputted from the second communication terminal, outputting the resulting signal from the second connector, converting a signal inputted from the second connector and outputting the resulting signal from the second communication terminal for the mutual connection of the communication networks, wherein the electronic control unit includes:

at least one communication circuit portion disposed in the at least one plug-in connecting portion for transmitting and/or receiving signals between the communication line of the first communication network and the communication line of the at least one other communication network connected to the detachable relay unit when the detachable relay unit is plug-in connected with the at least one plug-in connecting portion.

4. The communication unit of claim 3, wherein the relay unit includes a first input/output portion to be plug-in connected with the plug-in connecting portion and a second input/output portion connected to the at least one other communication network, and a relay circuit portion connected between the first and second input/output portions for converting the protocol of a signal inputted from one of the first and second input/output portions and outputting the signal having the protocol converted to the other input/output portion.

5. The communication unit of claim 4, wherein the second input/output portion is connected to the communication network different from the one, to which the electronic control unit belongs, and/or to an electronic control unit different from the electronic control unit.

6. The communication unit of claim 3, further comprising a power supply circuit portion connected with a power supply line for supplying a power supply voltage to the electronic control unit and adapted to supply a part of the power supply voltage supplied from the power supply line to the relay unit via the plug-in connecting portion when the relay unit is plug-in connected with the plug-in connecting portion.

7. A communication system, comprising:

a plurality of communication networks formed in a vehicle, an electronic control unit having a gateway function for connecting a first communication network with at least one other communication network and performing functions allotted beforehand by transmitting and/or receiving signals via the communication networks and at least one plug-in connecting portion, the at least one plug-in connecting portion including a first connector connected with a communication line of the first communication network for carrying signals transmitted from and/or received by the electronic control unit and a first communication terminal to be plug-in connected with at least one detachable relay unit, thereby connecting the at least one detachable relay unit with the communication line of the first communication network, when the electronic control unit performs the gateway function, and the at least one detachable relay unit including a second communication terminal for mating with the first communication terminal and at least one second connector connected to the at least one other communication network, the at least one detachable relay unit including a relay circuit portion for converting the protocol of a signal inputted from the second communication terminal, outputting the resulting signal from the second connector, converting a signal inputted from the second connector and outputting the resulting signal from the second communication terminal for the mutual connection of the communication networks, wherein the electronic control unit includes:

at least one communication circuit portion disposed in the at least one plug-in connecting portion for transmitting and/or receiving signals between the communication line of the first communication network and the communication line of the at least one other communication network connected to the detachable relay unit when the detachable relay unit is plug-in connected with the at least one plug-in connecting portion.

* * * * *